(12) United States Patent
Oh

(10) Patent No.: US 8,115,730 B2
(45) Date of Patent: Feb. 14, 2012

(54) INPUTTING DEVICE WHICH HAS KEYS WITHIN FINGER'S MOVEMENT AND INPUTTING METHOD

(76) Inventor: Ui Jin Oh, Daejeon (KR)

( * ) Notice: Subject to any disclaimer, the term of this patent is extended or adjusted under 35 U.S.C. 154(b) by 490 days.

(21) Appl. No.: 10/545,415

(22) PCT Filed: Feb. 13, 2004

(86) PCT No.: PCT/KR2004/000291
§ 371 (c)(1), (2), (4) Date: Jun. 5, 2006

(87) PCT Pub. No.: WO2004/072837
PCT Pub. Date: Aug. 26, 2004

(65) Prior Publication Data
US 2007/0002023 A1    Jan. 4, 2007

(30) Foreign Application Priority Data
Feb. 14, 2003  (KR) .................. 10-2003-0009456

(51) Int. Cl.
*G09G 5/00* (2006.01)
(52) U.S. Cl. ................... 345/156; 345/157; 345/160
(58) Field of Classification Search .......... 345/156–169
See application file for complete search history.

(56) References Cited

U.S. PATENT DOCUMENTS

| 5,473,325 | A | * | 12/1995 | McAlindon | ............. 341/20 |
| 5,670,955 | A | * | 9/1997 | Thorne et al. | ............. 341/34 |
| 6,348,911 | B1 | * | 2/2002 | Rosenberg et al. | ............. 345/161 |
| 6,497,618 | B1 | * | 12/2002 | Nishiumi et al. | ............. 463/36 |
| 6,567,072 | B2 | * | 5/2003 | Watanabe | ............. 345/161 |

(Continued)

FOREIGN PATENT DOCUMENTS

JP    57-010832    1/1982

(Continued)

OTHER PUBLICATIONS

Chinese Office Action dated Nov. 3, 2006 in corresponding Chinese Application No. 200480007529.0.

(Continued)

*Primary Examiner* — Vijay Shankar
(74) *Attorney, Agent, or Firm* — LRK Patent Law Firm

(57) ABSTRACT

Disclosed are an input device in which an input key is located within the movement radius of a user's fingers, and a method for inputting a command using the input device. To this end, the input device according to the present invention comprises: an input key located within the movement radius of a user's fingers to be moved in the front, rear, left and right directions within the movement radius of the fingers, for inputting the variety of commands therethrough; a plurality of sensing means regularly arranged within the movement radius of the fingers, for sensing approach of the input key thereto or contact of the input key therewith to send a sensing signal; and a controller for receiving the sensing signal from the plurality of sensing means, determining which one of the plurality of sensing means has sent the sensing signal thereto, extracting an inputted command based on the received signal, and instructing corresponding execution means to execute the extracted command. According to the present invention, desired input commands can be inputted only by moving at least one input key in the front, rear, left and right directions. This method can reduce the size of the input device to the extent of the movement radius of a user's fingers. It is thus possible to provide an input device of an electronic device that can follow a current trend toward miniaturization of the device.

11 Claims, 6 Drawing Sheets

U.S. PATENT DOCUMENTS 6,580,414 B1 * 6/2003 Wergen et al. ................ 345/156
2003/0206151 A1 * 11/2003 Oross et al. .................. 345/156

FOREIGN PATENT DOCUMENTS

| JP | 2002-157082 | 5/2002 |
| JP | 2002-312118 | 10/2002 |
| KR | 1020000047612 | 7/2000 |
| KR | 1020010107477 | 12/2001 |

OTHER PUBLICATIONS

International Search Report dated May 13, 2004 of the corresponding PCT/KR2004/000291 international application.

Third Office Action issued in Chinese Application No. 20040007529.0 issued Sep. 28, 2007.

Second Office Action issued in Chinese Application No. 20040007529.0 issued Jun. 1, 2007.

* cited by examiner (A)

(B)

(A)　　　　　　　(B)

(A)　　　　　　　(B)

INPUTTING DEVICE WHICH HAS KEYS WITHIN FINGER'S MOVEMENT AND INPUTTING METHOD

CROSS-REFERENCES TO RELATED APPLICATIONS

This is a US National Stage of International Application PCT/KR2004/000291, filed Feb. 13, 2004, published as International Publication WO 2004/072837 on Aug. 26, 2004, and incorporated herein by reference. The benefit of priority is further claimed to Republic of Korea Patent Application No. 10-2003-0009456, filed Feb. 13, 2003, published as Republic of Korea Unexamined Patent Publication KR 10-2004-0073758 on Aug. 21, 2004, which is also incorporated herein by reference.

TECHNICAL FIELD

The present invention relates to an input device for inputting a variety of commands, and more particularly, to an input device in which an input key for inputting commands is disposed within the movement radius of a user's fingers so that it may be applied to miniaturized electronic devices, and a command input method using the same.

BACKGROUND ART

Generally, an electronic device is equipped with an input device for inputting contents of a predetermined work to execute it.

For example, the input device includes a keyboard of a household computer, input buttons of a mobile phone or the like.

Such an input device is usually configured of a button type in which buttons are hit or depressed.

In this button type input device, there is a limitation in reducing the size of the button, and hence it does not follow a trend toward miniaturized electronic devices.

Taking a computer keyboard as an example, the keyboard usually has 107 input keys. Even if overlapped input keys are omitted, there are 89 input keys.

A user strikes the keyboard using all the fingers of his or her both hands in order to input characters, numerals, symbols, etc.

When a user utilizes the computer, it is important to rapidly strike the keyboard in order to input commands.

If the size of the keyboard is reduced, however, two or more input keys can be depressed by one finger only. As a result, there is a limitation in miniaturizing the size of the keyboard. This does not follow a trend in which a monitor and a CPU are miniaturized so that they can be portable.

In order to solve this problem, there was disclosed Korean Patent Application No. 10-2001-0014923 (Mar. 22, 2001) entitled "Handheld Type Keypad Device That Can Be Manipulated By One Finger" in which a somewhat small input keys are arranged circularly.

In the above device, however, in order to secure a space between the input keys, the size of the input key is made a little small and the input keys are only arranged circularly. Thus, there is a limit in miniaturizing the input device.

Furthermore, even the miniaturization of the above degree does not follow a current trend toward size reduction of electronic devices.

DISCLOSURE OF INVENTION

Accordingly, the present invention has been made in view of the above problems, and it is an object of the present invention to provide a miniaturized input device for inputting a plurality of commands even with the movement of an input key, which can be moved in the front, rear, left and right directions within the movement radius of a user's fingers.

Another object of the present invention is to provide a miniaturized input device having a control handle that can be coupled and decoupled to and from an input key, wherein when the control handle is coupled to the input keys, the input key serves as a Joystick of a game machine, allowing a user to enjoy a game.

According to the present invention, if a small number of input keys that can be moved in the front, rear, left and right directions within the movement radius of a user's fingers are moved to a portion where an input command has been set, sensing means disposed at the portion where the input command has been set senses the input keys and sends a sensing signal to a controller.

If the sensing signal is received from the sensing means, the controller determines which sensing means has sent the signal thereto to extract an inputted command and instructs each execution means to execute the extracted command, thereby minimizing the number of input keys and miniaturizing the input device.

To achieve the above objects, according to the present invention, there is provided an input device for inputting a variety of commands, including: an input key located within the movement radius of a user's fingers to be moved in the front, rear, left and right directions within the movement radius of the fingers, for inputting the variety of commands therethrough; a plurality of sensing means regularly arranged within the movement radius of the fingers, for sensing approach of the input key thereto or contact of the input key therewith to send a sensing signal; and a controller for receiving the sensing signal from the plurality of the sensing means, determining which one of the plurality of sensing means has sent the sensing signal thereto, extracting an inputted command based on the received signal, and instructing corresponding execution means to execute the extracted command.

BRIEF DESCRIPTION OF DRAWINGS

Further objects and advantages of the invention can be more fully understood from the following detailed description taken in conjunction with the accompanying drawings in which:

FIG. 8 is a schematic view showing that the length of the input key according to the present invention is vertically adjusted, wherein FIG. 8(A) shows a state where the length of the input key is not extended vertically and FIG. 8(B) shows a state where the length of the input key is extended vertically;

FIG. 9 is a schematic view illustrating the construction of an angular control unit according to the present invention, wherein FIG. 9(A) shows a state where the angular control unit is not used and FIG. 9(B) shows a state where the angular control unit is used.

BEST MODE FOR CARRYING OUT THE INVENTION

The present invention will now be described in detail in connection with preferred embodiments with reference to the accompanying drawings.

The accompanying drawings is merely an example illustrated for more concretely describing the technical sprit of the present invention which is not limited thereto.

An input key 10 is a device that is manipulated by a user who wants to input a command.

If an input key of a depression type as in the prior art is used, a plurality of input keys are required, which contributes to a limitation in miniaturizing the size of the input device.

In order to overcome this problem, according to the present invention, a command to be instructed is inputted by moving the input key 10.

In the case where the shoulder of a user is also moved upon the moving of the input key 10, the user may feel tired a lot when inputting a lot of commands and cannot rapidly input the commands.

In view of the above, it is preferred that the input key 10 be moved in the front, rear, left and right directions within the movement radius of a user's fingers for allowing for the movement of the fingers.

In other words, it is preferable that a command to be instructed be inputted by moving only the fingers or the wrist.

Such an input key 10 can be designed so that it returns to a predetermined original point if the finger is released from the input key after moving the input key to a predetermined location (not shown).

In addition, the input device may be designed so that the user can confirm what sensing means 20 which will be described later senses the input key 10 through fingertips' sense or a voiceless sound.

Through this structure, the sensing of predetermined sensing means 20 of the input key 10 can be confirmed through the fingertips' sense or a voiceless sound. It is thus possible to move the input key 10 to only a predetermined location.

Figure 3:
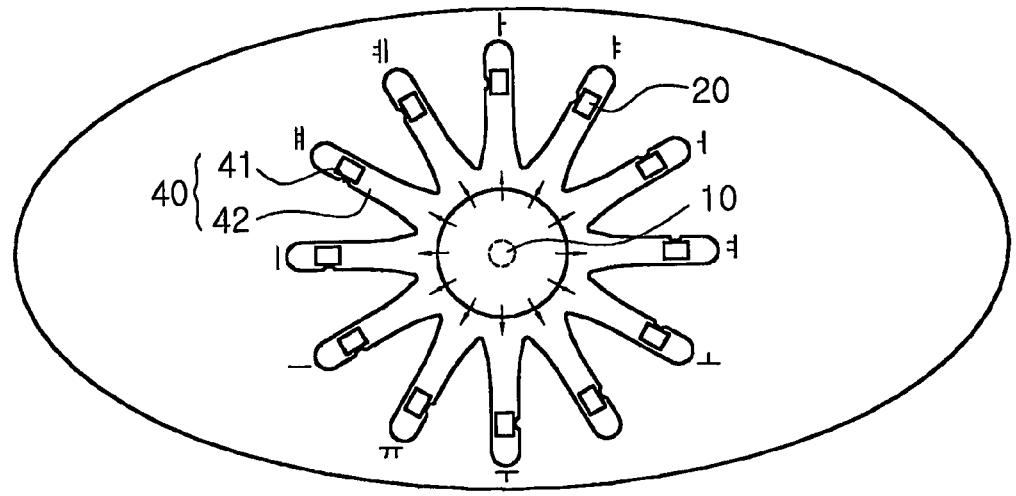
FIG. 3 is a top view schematically illustrating an input device in which input keys according to the present invention are disposed within the movement radius of a user's fingers.

A concrete example of the sensing through the fingertips' sense includes a method in which the input key 10 is brought into contact with a protrusion 41 while the input key 10 is moved, as in FIG. 3.

A concrete example of the sensing through the voiceless sound includes a method of outputting a sound through the speaker if a controller 30 receives a sensing signal from the sensing means.

It is preferred that the input key 10 of the present invention be moved only in the direction in which the sensing means 20 is located by means of an input key guide means 40.

Through this construction, it is possible to move the input key 10 to an exact point even though the location of the sensor 20 is not confirmed with the naked eye in a state where the location of the sensing means 20 is recognized through repetitive uses.

In other words, if the input key 10 is moved in a state where the location of the sensing means 20 is not confirmed with the naked eye, it is not so easy to exactly move the input key 10 to the direction where desired sensing means 20 is located.

This causes a problem that an input command cannot be rapidly inputted.

Therefore, by allowing the input key 10 to move toward only the direction where the sensing means 20 is located by means of the input key guide means 40, an exact input is made possible.

The input key guide means 40 can be implemented in a variety of shapes.

For example, the input key 10 entered into an wider inlet of a guide slit 42 as shown in FIG. 1 to FIG. 5 is moved along the guide slit 42 of a narrower width, and the sensing means 20 is disposed in the direction along which the guide slit 42 extends.

Figure 6:
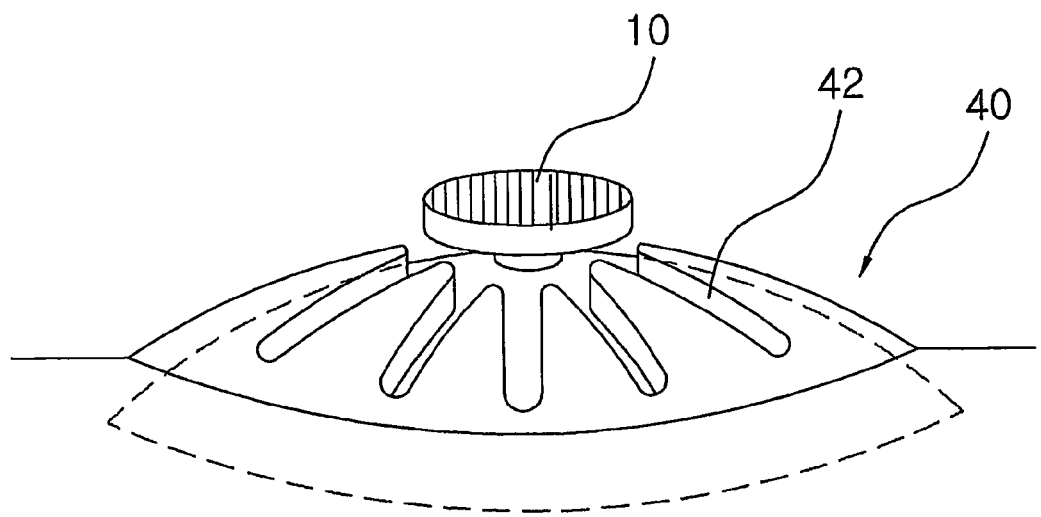
FIG. 6 is a schematic view illustrating the construction of an input key guide means protruded in a hemispherical shape.
Figure 7:
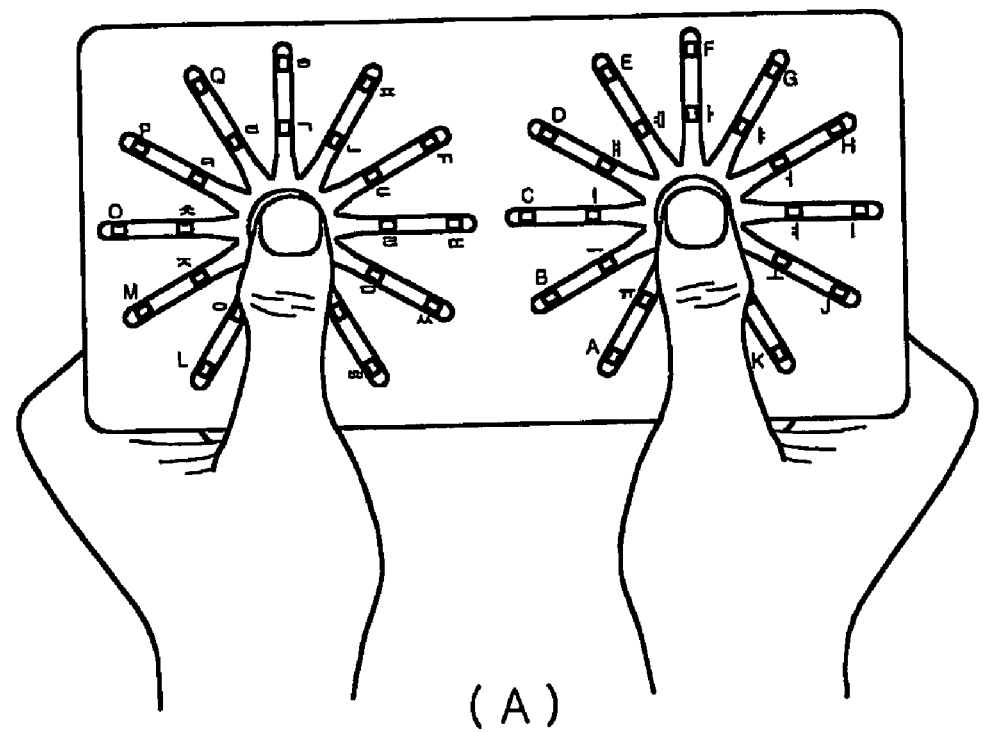
FIG. 7 is a view showing how to use the input device according to the present invention, wherein FIG. 7(A) schematically shows an input device in which input keys are located within the movement radius of a user's fingers with the input device hold by a user's both hands and FIG. 7(B) schematically shows an input device in which input keys are located within the movement radius of a user's fingers with the input device located on the ground.
Figure 7:
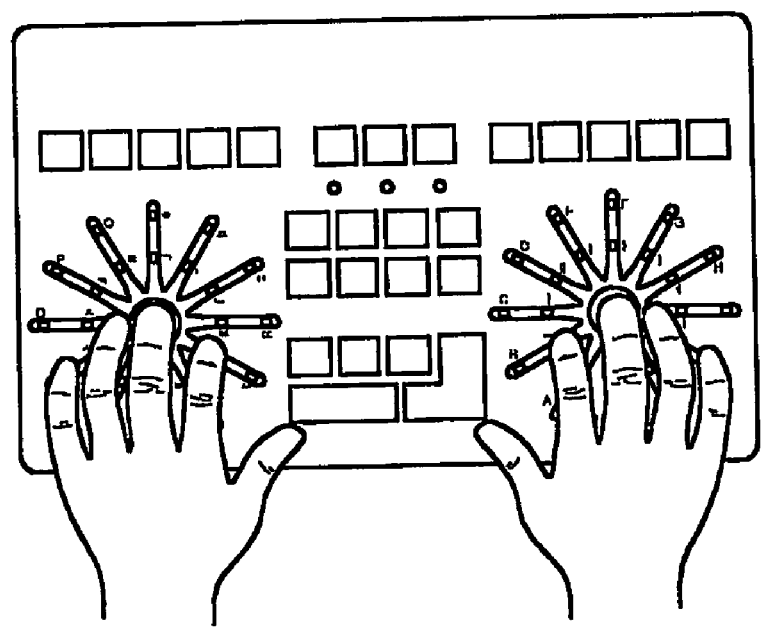

The input key guide means 40 may be designed to protrude in a hemispherical shape, as shown in FIG. 6, so that the input key 10 can be easily moved through the input key guide means.

The sensing means 20 serves to sense whether the input key 10 has moved and grasping the location to which the input key has moved to detect which command has been inputted.

Therefore, the sensing means 20 has to be located within the movement radius of the fingers. If the input key 10 approaches or is brought into contact with the sensing means 20, the sensing means 20 has to sense it and send a sensing signal.

Furthermore, since the moving location of the input key 10 varies according to a command to be inputted, the sensing means 20 must be installed in plural at locations to which the input key 10 can move, and their installation locations must be different from one another.

It is preferred that these sensing means 20 be regularly arranged according to a certain format so that the user can easily memorize them.

In addition, in transmitting the sensing signal, a wired method may be used or a wireless method using frequencies may be used.

Such means 20 may be implemented by a method of employing a limit switch or sensing means.

However, as the method employing the limit switch has a limitation in miniaturizing the device, it is preferred that a method employing a photo sensor, etc. be used.

The controller 30 is a kind of a common controller provided in common electronic products, for controlling respective elements constituting the electronic product. The controller 30 corresponds to a central processing unit (CPU) of a computer.

However, the controller 30 of the present invention serves to extract a command inputted through the sensing signal sent thereto from the sensing means 20. The extraction method employs a method of determining which sensing means 20 has sent the sensing signal to the controller 30 among the plurality of the sensing means 20.

Accordingly, the controller 30 of the present invention has a receiving section for receiving the sensing signal from the sensing means 20.

Furthermore, the controller 30 includes a program unit for allowing an input command to be extracted by a certain operation method when a predetermined sensing signal is received.

The controller further includes a database which is a basis of calculation. The controller has a function of transmitting the extracted input command to corresponding execution means and controls the execution means to execute the input command.

In the mode of receiving the sensing signal, a wired method may be used and a wireless method using frequency may be used.

The technical idea of the present invention will now be described in connection with preferred embodiments.

Embodiment 1

An example where the inventive input device is applied to an English keyboard of a notebook computer.

Figure 1:
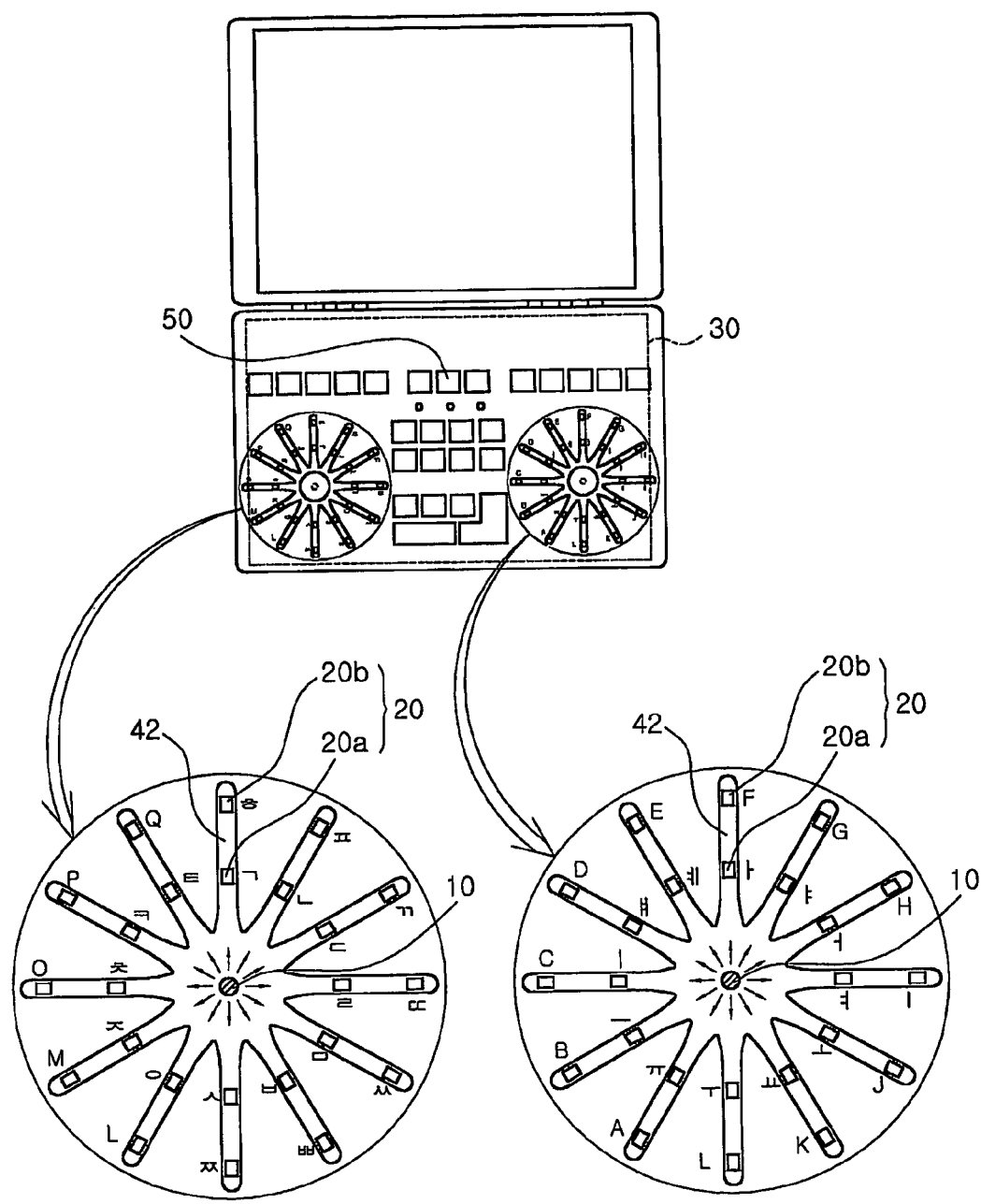
FIG. 1 is a schematic view illustrating a notebook computer to which the present invention is applied while being unfolded.

In a notebook computer keyboard shown in FIG. 1, an input key 10 that is frequently used among input keys 10 adopts an input method of the input device in which the input key of the present invention is located within the movement radius of a user's fingers, and an input key 10 that is not frequently used adopts a conventional switching type input method.

Furthermore, the input key 10 is adapted to move only in predetermined directions by means of the input key guide means 40. The predetermined movement directions are radial directions of the angles in which 360° is equally divided by 12. The sensing means 20 are arranged along the radial directions.

Also, the input device to which the technical idea of the present invention is applied can be provided on the right and left sides of the top surface of a notebook computer keyboard, respectively, so that English alphabetic letters can be inputted.

The action of the present invention applied to the English keyboard will now be described.

In a state where the input key 10 is located at the center of the movement radius of the fingers, no sensing means 20 senses the input key 10. This corresponds to a standby state where a command is ready to be inputted.

In this state, if the input key 10 of the input device on the left side of the notebook computer keyboard is pushed in the 8 o'clock direction, the input key 10 moves along the guide slit 42 in which an upper-case letter "M" is formed.

At this time, since a front portion of the guide slit 42 is wide in width, the input key 10 is entered into the guide slit 42 and then moves along the guide slit 42 in the 8 o'clock direction although the input key 10 does not move exactly in the 8 o'clock direction.

If the input key 10 moves along the guide slit 42 in the 8 o'clock direction, the sensing means 20 internally located in the 8 o'clock direction senses contact of the input key 10 with the sensing means 20 and then sends a sensing signal to the controller 30.

The controller 30, which has received the sensing signal from the sensing means 20, determines which sensing means 20 has sent the sensing signal thereto.

Then, the controller 30 determines that the sensing means 20 internally located in the 8 o'clock direction has sent the sensing signal through the above process, and confirms what the contents of a database corresponding to the sensing signal from the sensing means 20 internally in the 8 o'clock direction are.

Through the above process, the controller 30 determines that the contents of the database corresponding to the sensing signal from the sensing means 30 internally located in the 8 o'clock direction, is an upper-case letter "M" and controls the upper-case letter "M" to be displayed on execution means, i.e., a computer monitor.

As above, if an input key 10 of the input device located on the right side of the keyboard is moved in the 12 o'clock direction after the input device located on the left side of the keyboard has been executed, the sensing means 20 internally located in the 12 o'clock direction sense contact of the input key 10 therewith and then sends a sensing signal to the controller 30.

The controller 30, which has received the sensing signal form the sensing means 20, determines that the contents of the database corresponding to the sensing signal from the sensing means 20 internally located in the 12 o'clock direction is an upper-case letter "F" in the same manner that the input device located on the left side of the keyboard finds out the contents of the database corresponding to the sensing signal from the sensing means 20.

The controller 30 controls the checked upper-case letter "F" to be displayed on execution means, i.e., a computer monitor. Therefore, the two upper-case letters "MF" is finally displayed on the monitor.

Embodiment 2

An example where the inventive input device is applied to a Korean keyboard of a notebook computer In a notebook computer keyboard shown in FIG. 1, an input key 10 that is frequently used among input keys 10 adopts an input method of the input device in which the input key of the present invention is located within the movement radius of a user's fingers, and an input key 10 that is not frequently used adopts a conventional switching type input method.

Furthermore, the input key 10 is adapted to move only in predetermined directions by means of the input key guide means 40. The predetermined movement directions are radial directions of the angles in which 360° is equally divided by 12. The sensing means 20 are arranged along the radial directions.

In addition, the input device to which the technical idea of the present invention is applied is provided on the right and left sides of the top surface of a notebook computer keyboard, respectively. Korean consonants are inputted using the input devices on the left side of the top surface of the keyboard and Korean vowels are inputted using the input devices on the right side of top surface of the keyboard.

The action of the present invention applied to the Korean keyboard will now be described.

In a state where the input key 10 is located at the center of the movement radius of the fingers, no sensing means 20 senses the input key 10. This corresponds to a standby state where a command is ready to be inputted.

In this state, if the input key 10 of the input device on the left side of the notebook computer keyboard is pushed in the 3 o'clock direction, the input key 10 moves along the guide slit 42 in which Korean consonants "ㄹ, and ㄸ" are formed.

At this time, since a front portion of the guide slit 42 is wide in width, the input key 10 is entered into the guide slit 42 and then moves along the guide slit 42 in the 3 o'clock direction although the input key 10 does not move exactly in the 3 o'clock direction.

If the input key 10 moves along the guide slit 42 in the 3 o'clock direction, the sensing means 20 internally located in the 3 o'clock direction senses contact of the input key 10 with the sensing means 20 and then sends a sensing signal to the controller 30.

The controller 30, which has received the sensing signal from the sensing means 20, determines which sensing means 20 has sent the sensing signal thereto.

Then, the controller 30 determines that the sensing means 20 internally located in the 3 o'clock direction has sent the sensing signal through the above process, and confirms what the contents of a database corresponding to the sensing signal from the sensing means 20 internally in the 3 o'clock direction are.

Through the above process, the controller 30 determines that the contents of the database corresponding to the sensing signal from the sensing means 30 internally located in the 8 o'clock direction, is a Korean consonant "ㄹ" and controls the Korean consonant "ㄹ" to be displayed on execution means, i.e., a computer monitor.

As above, if an input key 10 of the input device located on the right side of the keyboard is moved in the 12 o'clock direction after the input device located on the left side of the keyboard has been executed, the sensing means 20 internally located in the 12 o'clock direction sense contact of the input key 10 therewith and then sends a sensing signal to the controller 30.

The controller 30, which has received the sensing signal form the sensing means 20, determines that the contents of the database corresponding to the sensing signal from the sensing means 20 internally located in the 12 o'clock direction is a Korean vowel "ㅏ" in the same manner that the input device located on the left side of the keyboard finds out the contents of the database corresponding to the sensing signal from the sensing means 20.

The controller 30 controls the checked Korean vowel "ㅏ" to be displayed on execution means, i.e., a computer monitor. Therefore, a Korean letter "라" is finally displayed on the monitor.

Embodiment 3

An example where the inventive input device is applied to a mobile phone.

Figure 2:
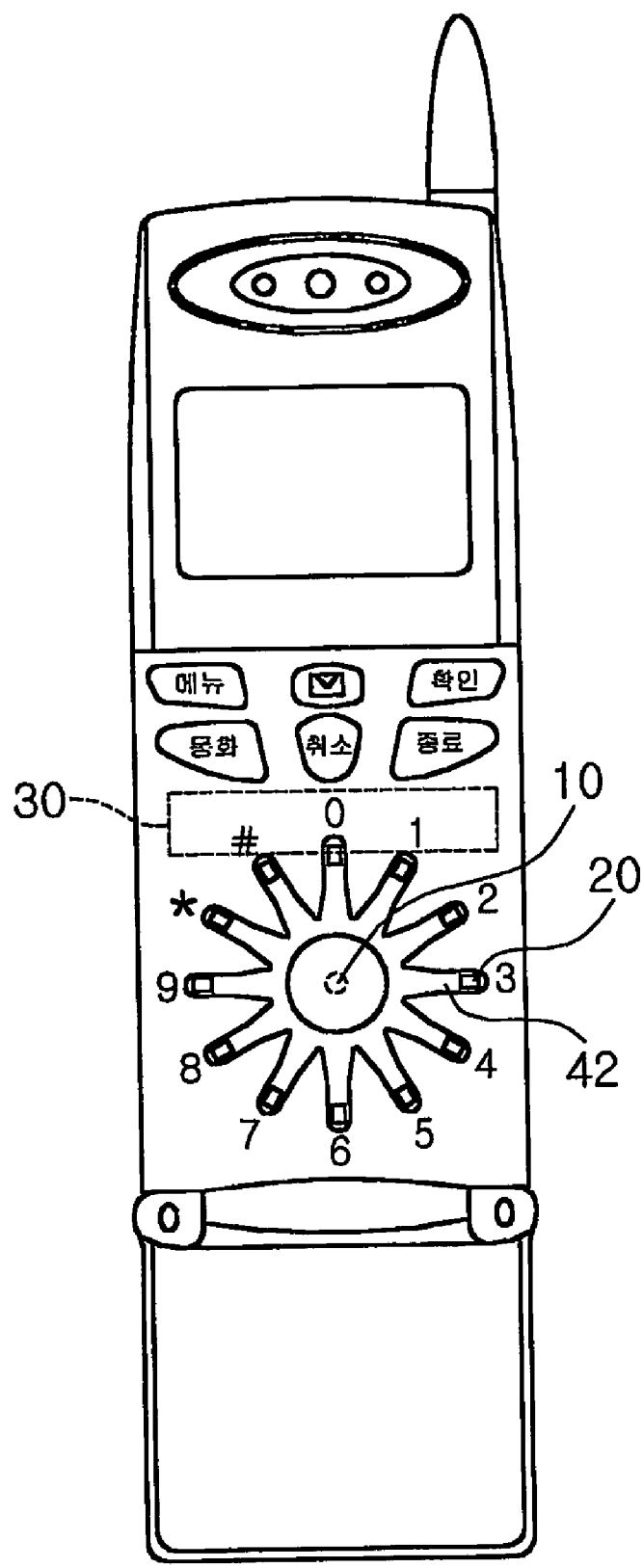
FIG. 2 is a schematic view illustrating a mobile phone to which the present invention is applied while being unfolded.

In a mobile phone shown in FIG. 2, an input key 10 that is frequently used among the input keys 10 adopts an input method of an input device in which the input keys are located within the movement radius of a user's fingers, and an input key 10 that is not frequently used adopts a conventional switching type input method.

Furthermore, the input key 10 is adapted to move only in predetermined directions by means of the input key guide means 40.

In addition, telephone numbers for telephonic communication can be inputted using the input device.

The action of the present invention applied to the mobile phone will now be described.

In a state where the input key 10 is located at the center of the movement radius of the fingers, no sensing means 20 senses the input key 10. This corresponds to a standby state where a command is ready to be inputted.

In this state, if the input key 10 of the input device is pushed in the 3 o'clock direction, the input key 10 moves along the guide slit 42 formed in the 3 o'clock direction.

If the input key 10 moves along the guide slit 42 in the 3 o'clock direction, the sensing means 20 located in the 3 o'clock direction senses contact of the input key 10 with the sensing means and then sends a sensing signal to the controller 30.

The controller 30, which has received the sensing signal from the controller 30, determines that the sensing means 20 located in the 3 o'clock direction has sent the sensing signal according to a predetermined detection method, and then confirms what the contents of a database corresponding to the sensing signal from the sensing means 20 in the 3 o'clock direction are.

Through the above process, the controller 30 confirms that the content of the database corresponding to the sensing signal from the sensing means 20 located in the 3 o'clock direction is a number "3" and memorizes "3" as the first number of the telephone number for telephonic communication.

If the movement of the input key 10 to the central portion of the input device and the movement of the input key 10 to the 6, 1, 2, 4, 8 and 3 o'clock directions are sequentially repeated, the controller 30 memorizes the inputted commands by finding out them in the same manner that the first number of the telephone number is detected.

In other words, the controller 30 determines that the inputted commands are 6, 1, 2, 4, 8 and 3 and memorizes a telephone number inputted for telephonic communication as 361-2483.

In this state, if a "call" button adopting the conventional input method is pressed, the number 361-2483 is connected.

Meanwhile, in applying the present invention to input devices of various fields, there is a case where commands to be inputted are various and numerous.

For example, the computer's keyboard usually has 107 input keys. Even if overlapped keys are omitted, the computer's keyboard has 89 input keys.

Most of the 89 input keys are designed to input two kinds of input contents by using a function switch key 50.

In this case, the technical spirit for applying the present invention will be described.

In case of the above, it can be implemented by arranging a plurality of sensing means 20 corresponding to respective input commands in a predetermined space.

For a rapid input, however, it is preferred that the sensing means 20 are regularly arranged. If the input keys 10 are too much closely arranged, it is very difficult to exactly move the input key 10 to a location where desired sensing means 20 is located.

Therefore, in order to keep a progressive direction angle of the input key 10 large as in FIG. 1, it is preferred that a plurality of input keys 10 be provided in the same progressive direction, and plural sensing means 20 are disposed with the input keys 10 spaced apart from each other in a progressive distance thereof.

In this case, in order for the sensing means 20 to be located at an outside in the same direction to sense the input keys 10, it is required that the input keys 10 pass the sensing means 20 internally located in the same direction.

This is to prevent any confusion to the controller 30 since even the sensing means 20 internally located in the same direction may sense the input key 10.

To this end, in extracting an input command by the controller 30, there is a method for accepting the finally received sensing signal as an inputted command if two or more sensing signals are received within a predetermined time period.

For example, in the case where the input device is constructed as in FIG. 1, if the input key 10 on the left of the keyboard is moved by maximum in the 12 o'clock direction, both sensing means 20a internally located in the 12 o'clock direction and sensing means 20b externally located in the 12 o'clock direction sense contact of the input key 10 therewith and then sends a sensing signal to the controller 30.

The sensing signal sent from the sensing means 20a internally located is received faster than the sensing signal sent from the sensing means 20b externally located, and a difference in a time when the sensing signals are received is very short.

If predetermined sensing means 20 are continuously received within a shorter time period than a predetermined time period using this property, a sensing signal that is finally received is regarded as an inputted command.

In this case, in sensing means internally in the 12 o'clock direction and sensing means internally located in the 1 o'clock, the progressive directions of the input keys 10 are different. Thus, although the sensing signals are continually received within a short time period, the finally received sensing signal is accepted as the input command, but both the signals are accepted as the input command.

If this method is employed, all the sensing means 20 corresponding to respective input commands can be regularly arranged.

In the above method, however, one sensing means 20 is disposed every input command. This makes it difficult to miniaturize the device.

In view of the above, it is necessary to extract input commands based on different databases although the same input signal is received as in a method for extracting the input command in the conventional input device.

That is, there is provided a function switch key 50, which can control the extraction of the input command of the controller 30 so that different commands are extracted by extracting the input command based on different databases, even if the controller 30 receives the same sensing signal from the same sensing means 20.

Figure 4:
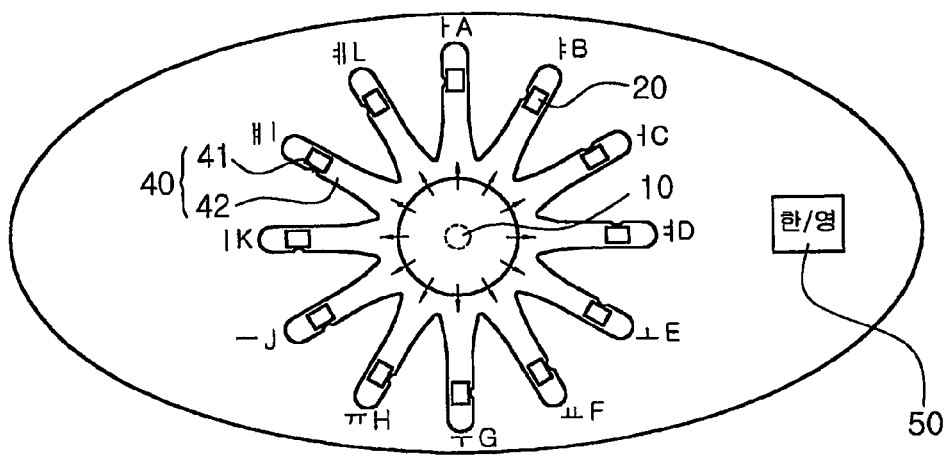
FIG. 4 is a top view schematically illustrating an input device having a function switch key in which input keys according to the present invention are disposed within the movement radius of a user's fingers.

For example, in case of FIG. 4, if the input key 10 is moved in the 2 o'clock direction, and the sensing means 20 senses contact of the input key 10 therewith and sends a sensing signal to the controller 30.

Furthermore, the controller 30 extracts the input command after confirming that the signal is received from the sensing means 20 located in the 2 o'clock direction.

In extracting the input command, the controller 30 extracts the input command as a Korean consonant "ㅏ" using the function switch key 50, if a database corresponding to the sensing means 20 located in the 2 o'clock direction is a Korean input database.

However, if the database corresponding to the sensing means 20 located in the 2 o'clock direction is an English input database, the controller 30 extracts the input command as an upper-case letter "C".

In other words, there is provided a plurality of databases each corresponding to each sensing means so that they are controlled by manipulating the function switch key 50.

Through such a construction, a plurality of input commands can be inputted using one sensing means 20. It is thus possible to further miniaturize the input device.

In the input device of the present invention, the input keys 10 can move in the front, rear, left and right directions and the plurality of the sensing means 20 are disposed. Accordingly, the input device of the present invention can be used as a Joystick for use in common games.

Figure 5:
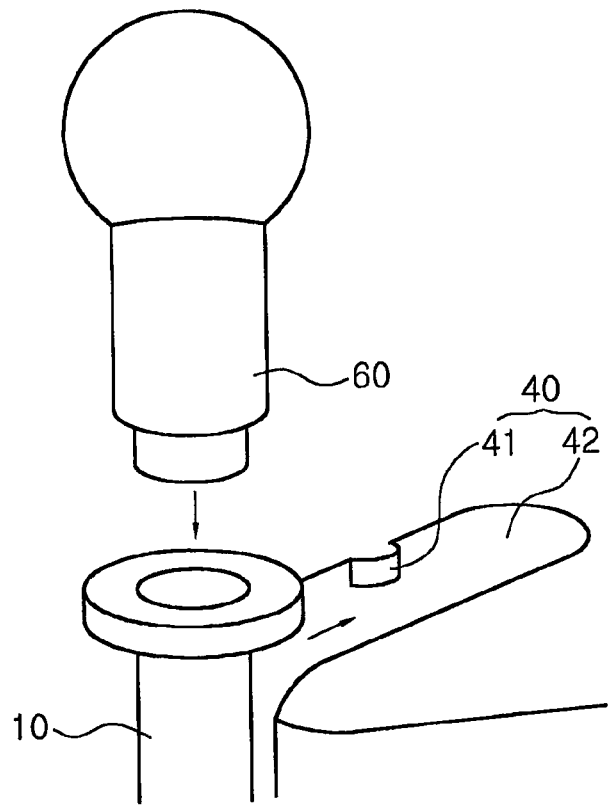
FIG. 5 is a schematic view illustrating the construction of a control handle according to the present invention.

More specifically, as shown in FIG. 5, a control handle 60, which can be decoupled and coupled from and to the input key 10, is provided and the controller 30 is equipped with a function provided in a Joystick for use in common games.

Thereafter, if the control handle 60 is coupled to the input key 10, the controller 30 controls the input key 10 to serve as a Joystick of a game machine.

Figure 8:
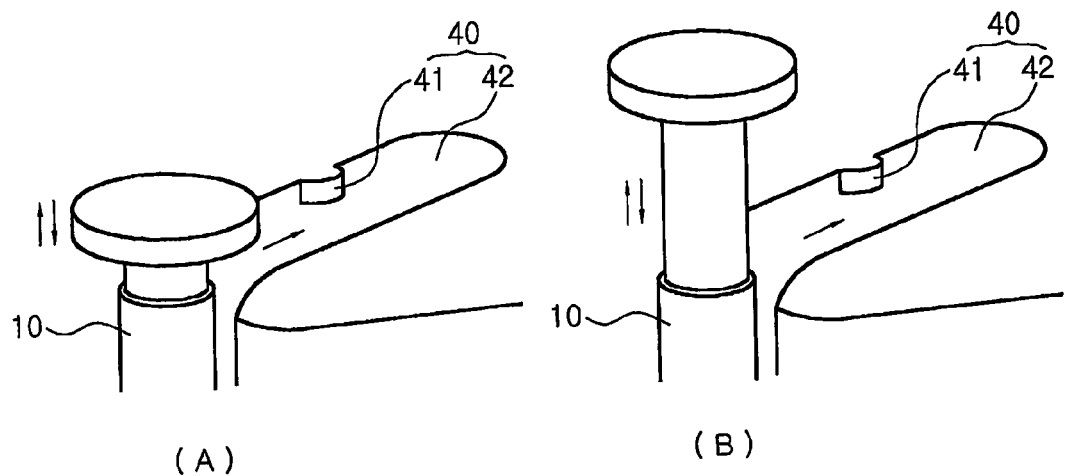

In addition, as shown in FIG. 8, the input key 10 is designed to be adjustable in length and the controller 30 is equipped with a function provided in a Joystick for use in common games.

If the input key 10 is pulled up to extend the input key 10 upwardly, the controller 30 controls the input key 10 to serve as a Joystick of the game machine.

According to the above construction, it is possible to overcome a problem that a user could not enjoy various kinds of games since the conventional button-type input device is used.

Of the conventional input devices, an angular control unit for adjusting an inclination angle of an input key is provided in the keyboard of the computer.

Figure 9:
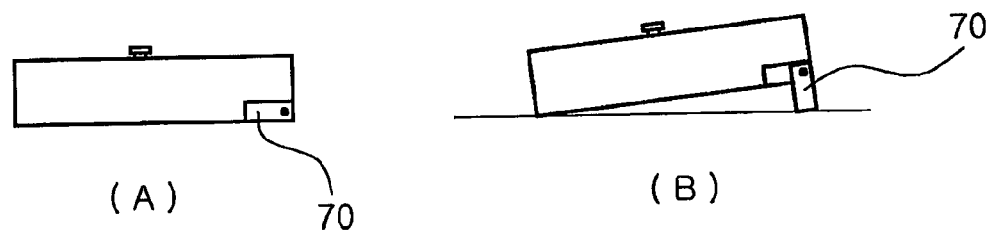

Even in the present invention, an angular control unit 70 for adjusting an inclination angle of the input key can be provided, as shown in FIG. 9.

Figure 10:
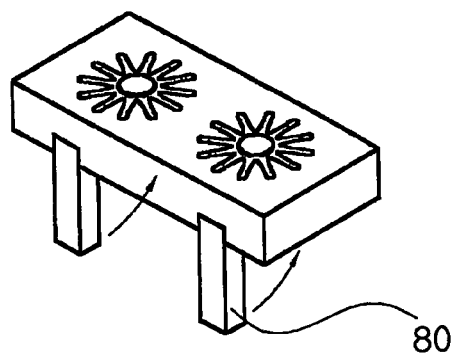
FIG. 10 is a schematic view illustrating the construction of a collapsible handle according to the present invention.

Furthermore, a collapsible handle 80 can be provided so that a user can use the input device while holding it in his or her hands, as shown in FIG. 10.

INDUSTRIAL APPLICABILITY

According to the present invention, desired input commands can be inputted only by moving at least one input key in the front, rear, left and right directions. This method can reduce the size of the input device to the extent of the movement radius of a user's fingers. It is thus possible to provide an input device of an electronic device that can follow a current trend toward miniaturization of the device.

Further, it is possible to input the input contents exactly and rapidly even if an input device is miniaturized.

In addition, a control handle that can be decoupled/coupled from/to input keys is provided and the input key serves as a Joystick of a game machine if the control handle is coupled to the input key. Therefore, the present invention has an effect that a user can enjoy a variety of games using a miniaturized input device.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An input device formed integrally with an electronic device for inputting one or more commands, comprising:
a first input key provided integrally with the top surface of the electronic device, the input key movable in a radial direction within a movement radius of a user's fingers, and configured to input the one or more commands, wherein a plurality of input key guide means formed in the radial direction around an axis of the input key having a radial symmetry, wherein the guide means include a guide slit and a contact with protrusion;
a plurality of sensors arranged regularly in the radial direction along with the guide slit within the movement radius of the user's fingers, and configured to send a sensing signal when an approach of the first input key to the sensor or a contact with protrusion of the first input key where the sensor is sensed, wherein each of the guide slit has at least a pair of sensors;
a controller configured to receive the sensing signal from the plurality of sensors, to determine which one of the plurality of sensors has sent the sensing signal thereto, to extract an inputted command based on the received sending signal, and to instruct a corresponding execution unit to execute the extracted command; and a second input key forming a set with the first input key,
wherein the second input key has a plurality of letters disposed along a same movement route of the first input key, and
wherein a different letter is input depending in a movement distance of the first input key and the second input key in combination.

2. The input device according to claim 1, further comprising:
a function switch key configured to control the extraction of the input command of the controller, wherein the input command can be received from a different database which stores a different letter while the controller receives the same sensing signal from the same one of the plurality of sensors.

3. The input device according to claim 1, further comprising:
a control handle detachably attached into the first input key.

4. The input device according to claim 1, wherein the first input key and the second input key are adjustable in length.

5. An input device for inputting various commands, comprising:
an input key having a top surface formed integrally within an electronic device and being movable in a radial direction, configured to input a command associated with a finger movement along with the radial direction;
a plurality of input key guide means formed in the radial direction around an axis of the input key having a radial symmetry, wherein the input key guide means include a guide slit and a contact with protrusion;
a plurality of sensing means regularly arranged in the radial direction along with the guide slit to send a sensing signal according to the finger movement of the input key to the contact with protrusion, wherein each of the guide slit has at least a pair of sensors; and
a controller configured to receive the sensing signal from the plurality of the sensing means, to determine from which the received sensing signal is sent, to extract an inputted command based on the received signal, and to execute the input command,
wherein the input command associated with the sensing signal has a plurality of letters disposed and the sensing signal is determined based on the movement distance and route of the input key to the contact with protrusion, wherein the plurality of letters are allocated to the sensors and can be extracted as an output using a predetermined database and an access logic controlled by the controller based on a movement distance of the input key, and wherein two input keys can be performed as one set to command.

6. The input device according to claim 5, further comprising:
a function switch key configured to control the extraction of the input command of the controller, wherein the input command can be received from a different database which stores different letters while the controller receives the same sensing signal from the same sensing means.

7. The input device according to claim 5, further comprising:
a control handle detachably attached into the input key.

8. The input device according to claim 5, wherein the input key is adjustable in length.

9. The input device according to claim 5, wherein the input key is formed integrally within an electronic device, and the height of the input key is the same level of the electronic device so as to be controlled by one finger of the user when inputting commands and can be applied to compact models including folded-type and slider-type electronic device applications.

10. A method for inputting various commands comprising:
forming an input key and guide means of the input key in a radial direction around an axis of the input key, wherein the guide means includes a guide slit and a contact with protrusion; and
arranging a plurality of sensors in the radial direction along with the guide slit based on the movement radius of the user's fingers to the contact with protrusion,
wherein a controller is configured to receive the sensing signal from the plurality of the sensing means, to determine from which the received sensing signal is sent, to extract an inputted command based on the received signal, and to execute the input command,
wherein the input command associated with the sensing signal has a plurality of letters and the sensing signal is determined based on the movement distance and route of the input key to the contact with protrusion, wherein plurality of letters are allocated to the sensors and can be extracted as an output using a predetermined database and an access logic controlled by the controller based on a movement distance of the input key to the contact with protrusion, and wherein two input keys can be performed as one set to command.

11. The method for inputting various commands according to claim 10, wherein the height of the input key is the same level of the electronic device so as to be controlled by one finger of the user when inputting commands and can be applied to compact models including folded-type and slider-type electronic device applications.

* * * * *